United States Patent [19]
Ehrlich et al.

[11] 3,987,372
[45] Oct. 19, 1976

[54] CHEMICAL LASER FROM RADIATIVE DECOMPOSITION OF CHEMICALS

[75] Inventors: John J. Ehrlich; Thomas A. Barr, Jr., both of Huntsville, Ala.

[73] Assignee: The United States of America as represented by the Secretary of the Army, Washington, D.C.

[22] Filed: Sept. 30, 1974

[21] Appl. No.: 510,518

[52] U.S. Cl. .................... 331/94.5 P; 331/94.5 G; 331/94.5 C; 330/4.3
[51] Int. Cl.² .................. H01S 3/095; H01S 3/08; H01S 3/22
[58] Field of Search ................ 331/94.5; 330/4.3

[56] References Cited
UNITED STATES PATENTS
3,753,147    8/1973    Schulthess .................... 331/94.5 C OTHER PUBLICATIONS
Sousa et al., Optical Spectra, July/Aug., 1969, pp. 48–52.
Welson et al., Applied Physics Letters, vol. 20, No. 2, Jan. 15, 1972, pp. 64–66.
Basov et al., JETP Letters, vol. 15, No. 3, Feb. 5, 1972, pp. 93–94.

Primary Examiner—Robert J. Webster
Attorney, Agent, or Firm—Nathan Edelberg; Robert P. Gibson; James T. Deaton

[57] ABSTRACT

A continuous wave chemical laser device in which useful species such as free radicals as vibrationally excited molecules are generated by interaction of suitable chemicals such as hydrogen, sulfur hexafluoride, and carbon dioxide with laser radiation. The chemical laser device is capable of generating active species by interaction of its own laser radiation after first being initiated by a suitable initiator. The chemical reactions involved can take place at atmospheric pressure or higher and overcome disadvantages of ordinary chemical lasers.

1 Claim, 1 Drawing Figure

U.S. Patent  Oct. 19, 1976  3,987,372
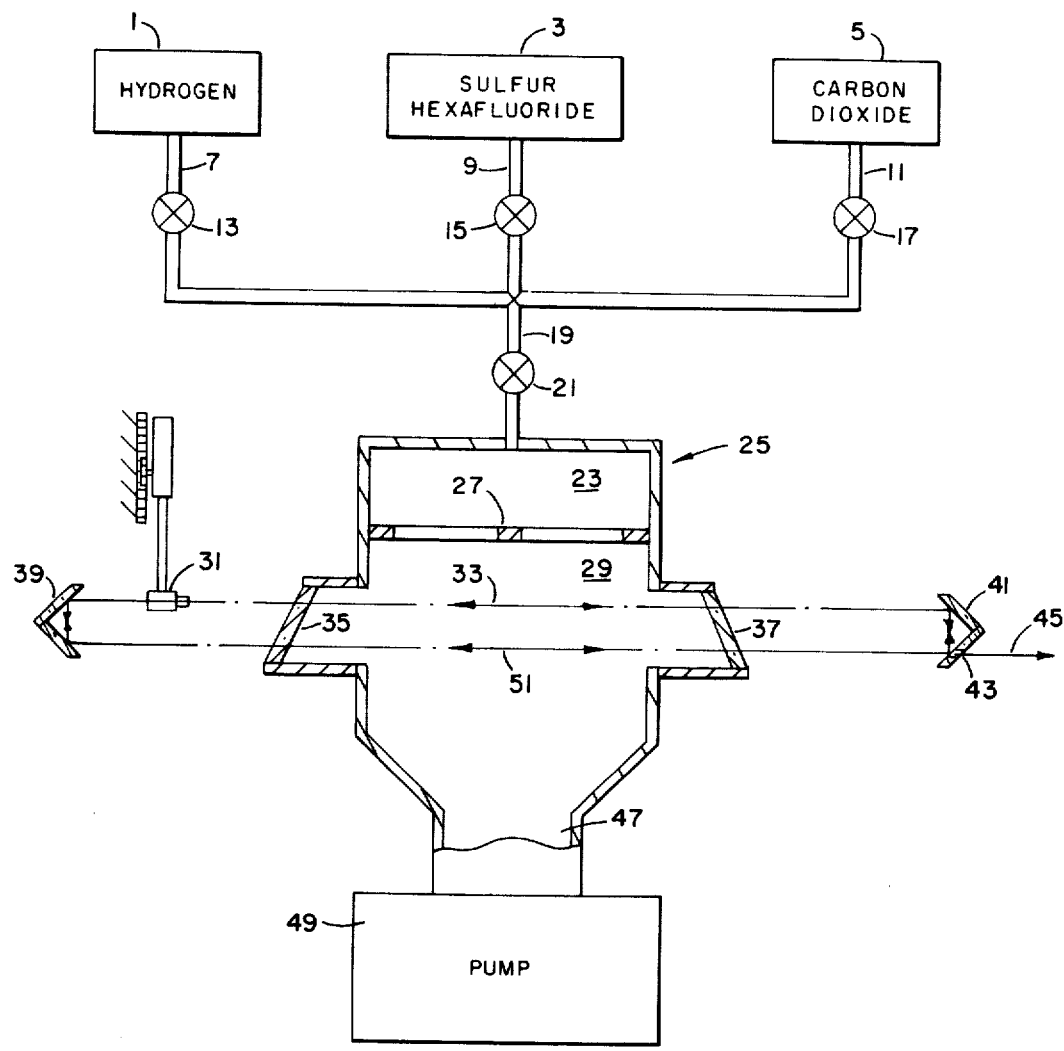

CHEMICAL LASER FROM RADIATIVE DECOMPOSITION OF CHEMICALS

BACKGROUND OF THE INVENTION

Known chemical laser devices utilize electric discharges, flash lamps, or flames to produce a highly excited species which is then allowed to react with other atoms or molecules to achieve population inversion necessary for lasing. Devices of this type require elaborate burners, mixers, premixers, power supplies and etc. Chemical lasers of this type also operate only at subatmospheric pressure which is not necessarily desirable.

Accordingly, it is an object of this invention to provide a continuous wave chemical laser which is self sustaining after being initially started.

Another object of this invention is to provide a chemical laser in which the chemical reactions involved can be carried out at atmospheric or higher pressure.

Still another object of this invention is to provide a chemical laser in which free radicals are generated by interaction of suitable chemicals with laser radiation.

A still further object of this invention is to utilize the free radicals generated by causing further chemical reaction with other compounds to ultimately produce a laser output.

SUMMARY OF THE INVENTION

In accordance with this invention, a method and apparatus for producing a continuous wave laser output from interaction of chemicals is disclosed. This invention involves mixing chemicals that do not normally react such as hydrogen, sulfur hexafluoride and carbon dioxide and injecting these chemicals into a reaction chamber. The chemicals pass through a flow control device into a reaction chamber and are initially subjected to an initiator source of laser or other initiation means which causes one of the chemical compounds such as the sulfur hexafluoride to be altered and thereby make it reactive with one or more of the other compounds present such as the hydrogen to produce therefrom vibrationally excited hydrogen fluoride. This vibrationally excited hydrogen fluoride is a laser active compound and it releases energy to the carbon dioxide for example such that the carbon dioxide becomes laser active. As the chemical process progresses after initiation, the laser output produced is partially reflected back by mirrors to cause free fluorine from the sulfur hexafluoride to be produced for further reaction with the hydrogen and carbon dioxide. Part of the laser energy produced is coupled out by any one of several accepted practices as a continuous wave laser output. The chemicals are caused to flow through the reaction chamber by pump means. As can be seen, the chemical process is initiated by one of several means such as electric discharge, photolysis, or laser radiation and this initiator causes at least one chemical compound to be altered and make it reactive with one or more of the other compounds present. This reaction occurs in such a way as to produce the specific effect desired such as a resultant chemical species in an excited state (electronic, vibrational, or rotational) so that laser action occurs or energy is transferred to another chemical in the fluids which will produce laser action. In either case, laser action generated by total or partial population inversion is envisioned as occurring in this process.

BRIEF DESCRIPTION OF THE DRAWING

The single FIGURE of the drawing is a diagrammatic view partially in section of a laser apparatus according to this invention.

DESCRIPTION OF THE PREFERRED EMBODIMENT

Referring now to the drawing, an apparatus and method for producing a continuous wave laser output is disclosed and includes containers 1, 3, and 5 with appropriate chemicals therein such as hydrogen in container 1, sulfur hexafluoride in container 3, and carbon dioxide in container 5. Containers 1, 3, and 5 are connected by lines 7, 9, and 11 through control valves 13, 15, and 17 respectively to a common line 19 that has control valve 21 that controls the overall flow of fluid into chamber 23 of reaction laser housing device 25. The chemicals delivered to chamber 23 are mixed and controlled by appropriate means for opening and closing valves 13, 15, 17, and 21. Plate 27 controls flow from chamber 23 and has one or more long slits therein, orifices, or a series of nozzles to control the flow from chamber 23 into reaction chamber 29. The chemicals in reaction chamber 29 are subjected to an initiator such as a laser light source 31 (diagrammatically illustrated) in the beginning to start the reaction and later, laser light source 31 that is adjustably mounted is moved out of path 33. Brewster angle windows 35 and 37 are mounted at opposite sides of the laser cavity and provide a path in which the light can travel. Light from windows 35 and 37 is delivered to mirrors 39 and 41. Also, mirror 41 has a passage 43 therein for allowing part of the laser beam to be taken off as an output 45. (Other accepted techniques for laser power extraction may also be used.) Laser housing device 25 has an outlet section 47 and a pump 49 for controlling flow of the chemicals through chamber 29 and to waste as exhaust from the laser device.

In operation, appropriate chemicals from sources 1, 3 and 5 are introduced into chamber 23 by control valves 13, 15, 17 and 21 and the chemicals are introduced as mixed chemicals into this chamber. Chemicals from chamber 23 pass through plate 27 and plate 27 acts not only as means for providing proper flow conditions but also as a flame arrestor. To start reaction of the chemicals that are now in chamber 29, laser initiator 31 is positioned for passing a laser beam along line 33 as illustrated. Assuming chemicals 1, 3 and 5 to be hydrogen, sulfur hexafluoride, and carbon dioxide respectively, the laser beam from laser 31 interacts with the sulfur hexafluoride to produce free fluorine atoms and lower valence sulfur compound of fluorine. As the fluorine atoms flow downstream, they react with the hydrogen to give excited hydrogen fluoride. The excited hydrogen fluoride then transfers its energy to the carbon dioxide which then lases and releases this energy along some path further downstream such as illustrated by path 51. Part of this energy of path 51 is reflected by mirrors 39, 41 into path 33 to sustain the chemical reaction. Useful continuous wave laser output at 45 is removed through passage 43 in partially transmitting mirror 41. Pump 49 removes the reacted chemicals from chamber 29 as they are expended.

If the reaction taking place in chamber 29 is at ambient pressure, Brewster angle windows 35 and 37 may be eliminated and mirrors 39 and 41 inserted in their place.

It is also pointed out that for slow flowing systems the formation of active species and the generation of laser power occur in essentially the same volume, but for fast flowing systems, e.g. supersonic flow, the process of generating active species occurs first in an area of initiation and laser power then is extracted at some downstream location as illustrated in the drawing.

We claim:

1. A device for use in producing a laser output, said device comprising a housing having first and second chambers therein, a flow device located between said chambers for controlling flow from said first chamber into said second chamber, said flow device being a plate which has a plurality of flow passages therein; said second chamber having openings therein on opposite sides of said housing with Brewster angle windows mounted in said openings; an outlet from said second chamber and a pump mounted relative thereto for removing expended material from said second chamber; means for introducing a plurality of chemicals into said first chamber to be mixed therein; a laser source initiator means adjustably mounted relative to said housing for movement into and out of a path passing through said openings to provide initiator means directed into said second chamber for initiating a reaction in said chemical mixture to ultimately form an active laser medium; angled reflectors mounted relative to said openings for receiving light from said second chamber for causing said light to stimulate a laser beam from said laser medium and for reflecting said light onto another surface of said reflectors and then re-reflecting said light back into said second chamber at a position upstream of said stimulated laser beam to provide sustained reaction initiation of said chemical mixture; and one of said reflectors having an opening therein for coupling out said laser beam.

* * * * *